(12) United States Patent
Inoue et al.

(10) Patent No.: US 7,907,481 B2
(45) Date of Patent: Mar. 15, 2011

(54) OPTICAL DISC DRIVE DEVICE AND TILT CORRECTION DEVICE

(75) Inventors: Takashi Inoue, Yokohama (JP); Hiroshi Shimada, Kamakura (JP); Akira Nakao, Yokohama (JP); Yasuhiro Hayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 12/337,033

(22) Filed: Dec. 17, 2008

(65) Prior Publication Data

US 2009/0161504 A1    Jun. 25, 2009

(30) Foreign Application Priority Data

Dec. 20, 2007    (JP) ................................. 2007-328828

(51) Int. Cl.
    *G11B 7/00*    (2006.01)
(52) U.S. Cl. .................. 369/44.29; 369/53.19
(58) Field of Classification Search .......... None
    See application file for complete search history.

(56) References Cited

U.S. PATENT DOCUMENTS

| | | | |
|---|---|---|---|
| 4,803,677 A * | 2/1989 | Yamaguchi et al. ....... | 369/44.26 |
| 4,890,273 A * | 12/1989 | Takeuchi et al. ........... | 369/44.36 |
| 5,007,038 A * | 4/1991 | Nakane et al. ............. | 369/44.11 |
| 5,124,964 A | 6/1992 | Hayashi | |
| 5,138,596 A * | 8/1992 | Yamada ...................... | 369/44.29 |
| 5,293,365 A * | 3/1994 | Rokutan .................... | 369/44.25 |
| 5,430,699 A * | 7/1995 | Matsubara et al. ......... | 369/44.32 |
| 5,539,710 A * | 7/1996 | Tokushuku et al. ........... | 369/126 |
| 5,581,523 A * | 12/1996 | Seki et al. .................. | 369/44.11 |
| 5,862,111 A * | 1/1999 | Arai ........................... | 369/44.36 |
| 6,178,145 B1 | 1/2001 | Hayashi et al. | |
| 6,249,496 B1 * | 6/2001 | Tsukahara et al. ........ | 369/44.28 |
| 6,917,571 B2 * | 7/2005 | Kusumoto et al. ........ | 369/44.29 |
| 7,088,646 B1 | 8/2006 | Inoue et al. | |
| 7,177,241 B2 * | 2/2007 | Nishiuchi .................. | 369/44.29 |
| 7,298,687 B2 * | 11/2007 | Kitahara et al. .......... | 369/112.23 |
| 2002/0114261 A1 * | 8/2002 | Yanagawa et al. ....... | 369/124.12 |
| 2004/0130986 A1 * | 7/2004 | Minase et al. ............. | 369/47.39 |
| 2004/0264353 A1 * | 12/2004 | Kitahara et al. .......... | 369/112.23 |
| 2005/0232090 A1 * | 10/2005 | Matsumoto et al. ....... | 369/30.1 |

(Continued)

FOREIGN PATENT DOCUMENTS

JP    2006-155891    6/2006

*Primary Examiner* — Peter Vincent Agustin
(74) *Attorney, Agent, or Firm* — Turocy & Watson, LLP

(57) ABSTRACT

An optical disc drive device has an FE signal generator which generates a focus error signal, a TE signal generator which generates a tracking error signal, a return beam detector which detects a return beam reflected by an optical disc after irradiated by an optical pickup to generate a return beam level signal, a return beam gain setting part which sets amplitude adjustment amount of the return beam level signal so that a signal level of the return beam level signal generated by the return beam detector coincides with a predetermined reference level, an FE gain setting part which sets amplitude adjustment amount of the focus error signal in accordance with the signal level of the return beam level signal adjusted by the return beam gain setting part so that a signal amplitude of the focus error signal is constant, and a TE gain setting part which sets amplitude adjustment amount of the tracking error signal in accordance with the signal level of the return beam level signal adjusted by the return beam gain adjustment part so that a signal amplitude of the tracking error signal is constant.

19 Claims, 13 Drawing Sheets

INTERNAL CONFIGURATION OF ERROR SIGNAL AMPLITUDE NORMALIZING CIRCUIT 39

U.S. PATENT DOCUMENTS

2005/0265205 A1* 12/2005 Chuang et al. ................ 369/116
2005/0281147 A1* 12/2005 Kim et al. ................. 369/44.14
2006/0215507 A1* 9/2006 Kawasaki et al. ......... 369/44.36
2006/0280058 A1* 12/2006 Tomioka .................... 369/44.13
2007/0274174 A1* 11/2007 Kosaki ....................... 369/44.36
2008/0049570 A1* 2/2008 Park et al. ................. 369/44.28

* cited by examiner

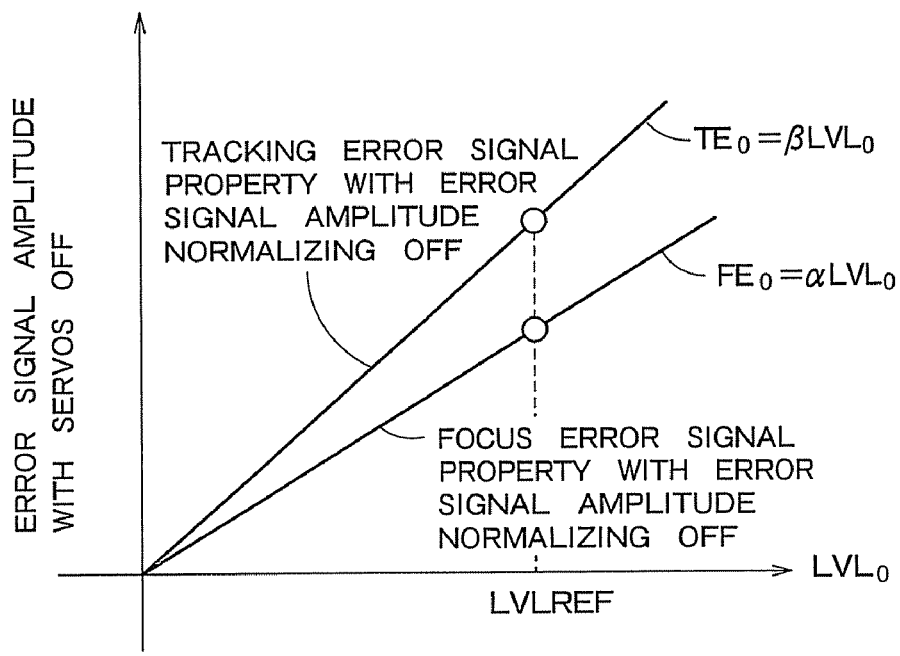
F I G. 4A
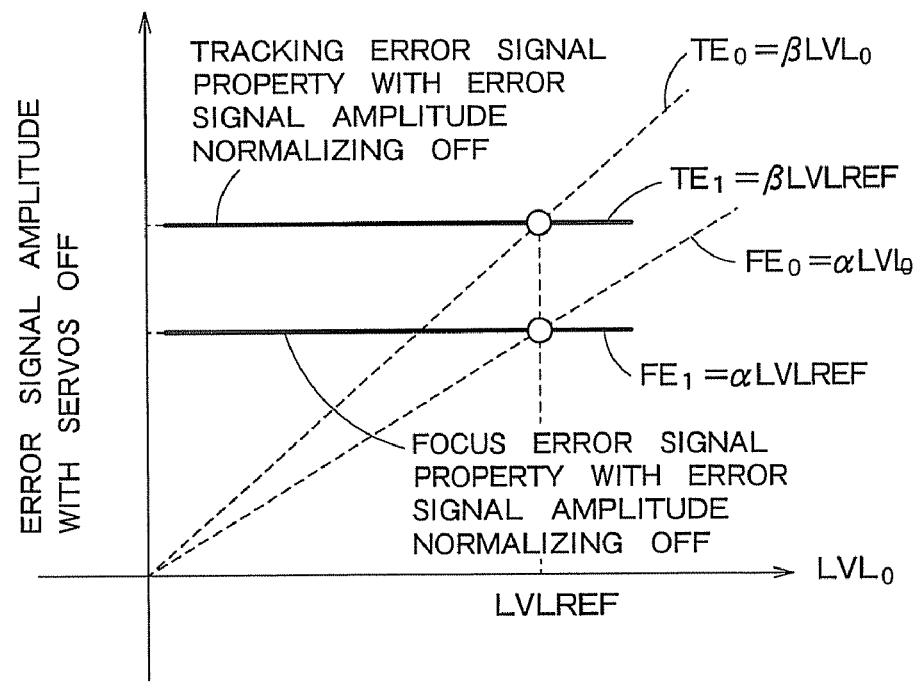
F I G. 4B

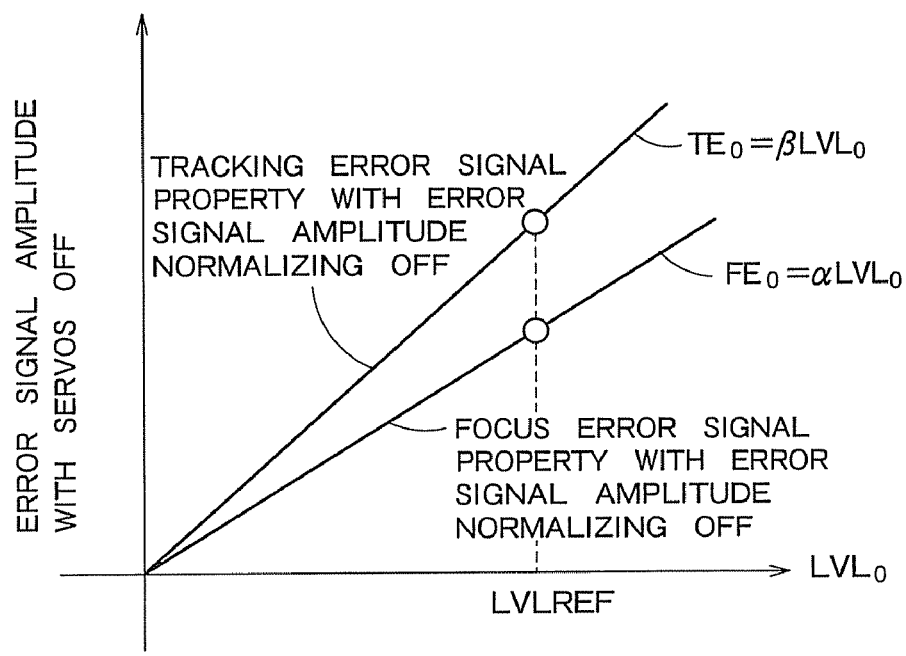
F I G. 5A
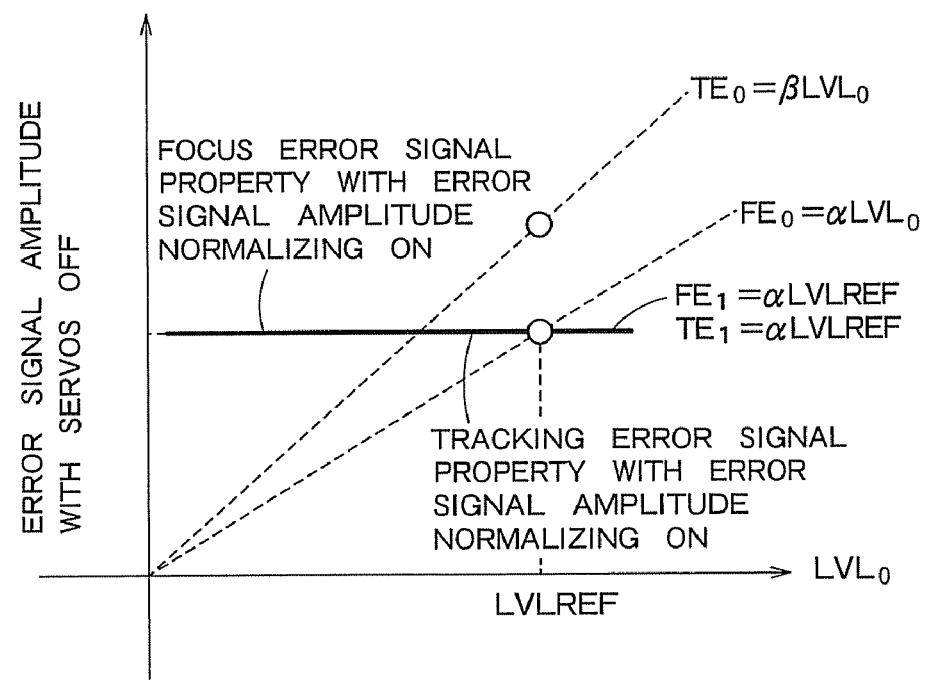
F I G. 5B

F I G. 6A
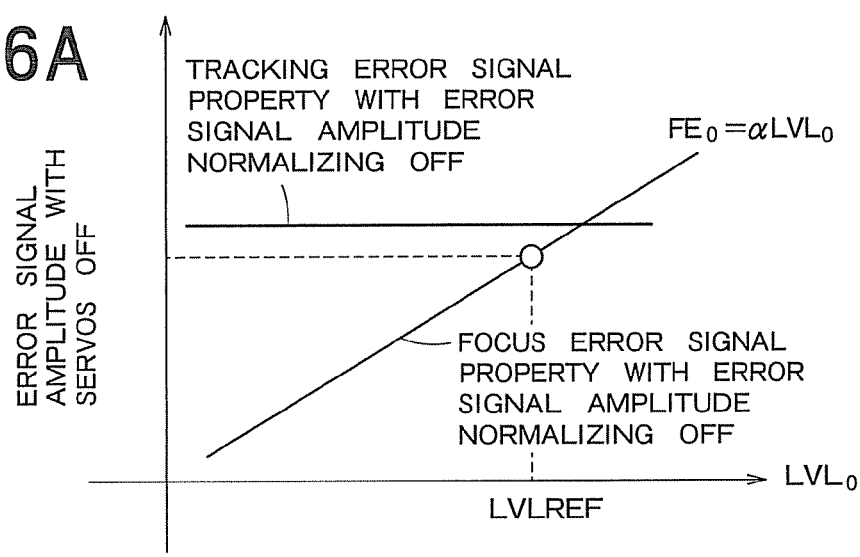
F I G. 6B
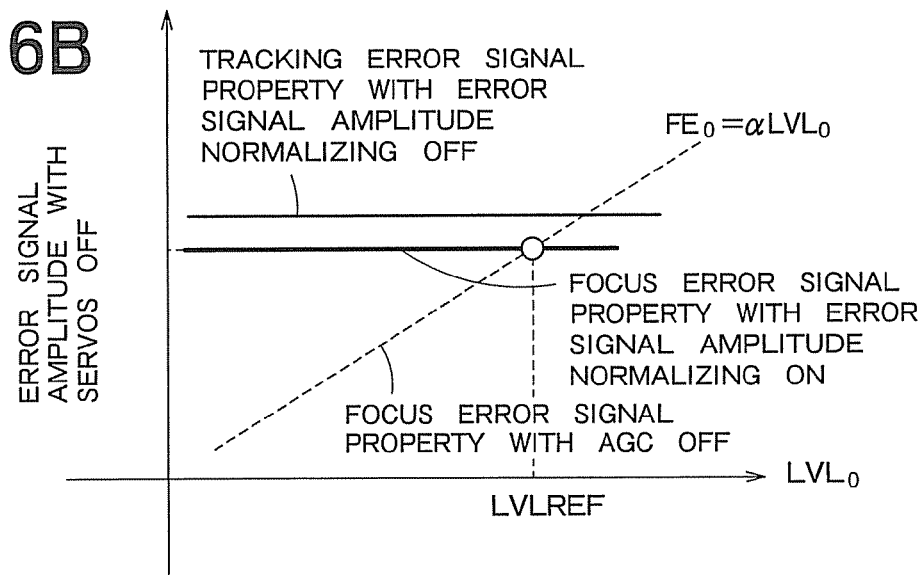
F I G. 6C
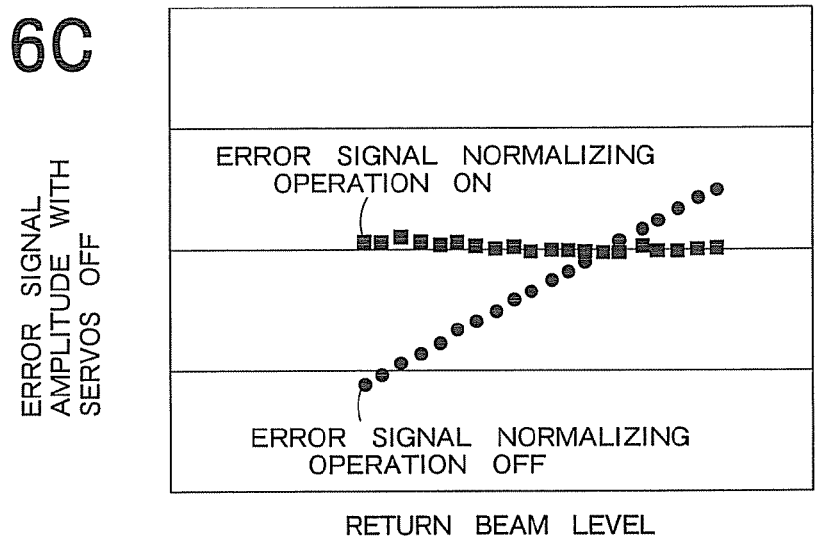

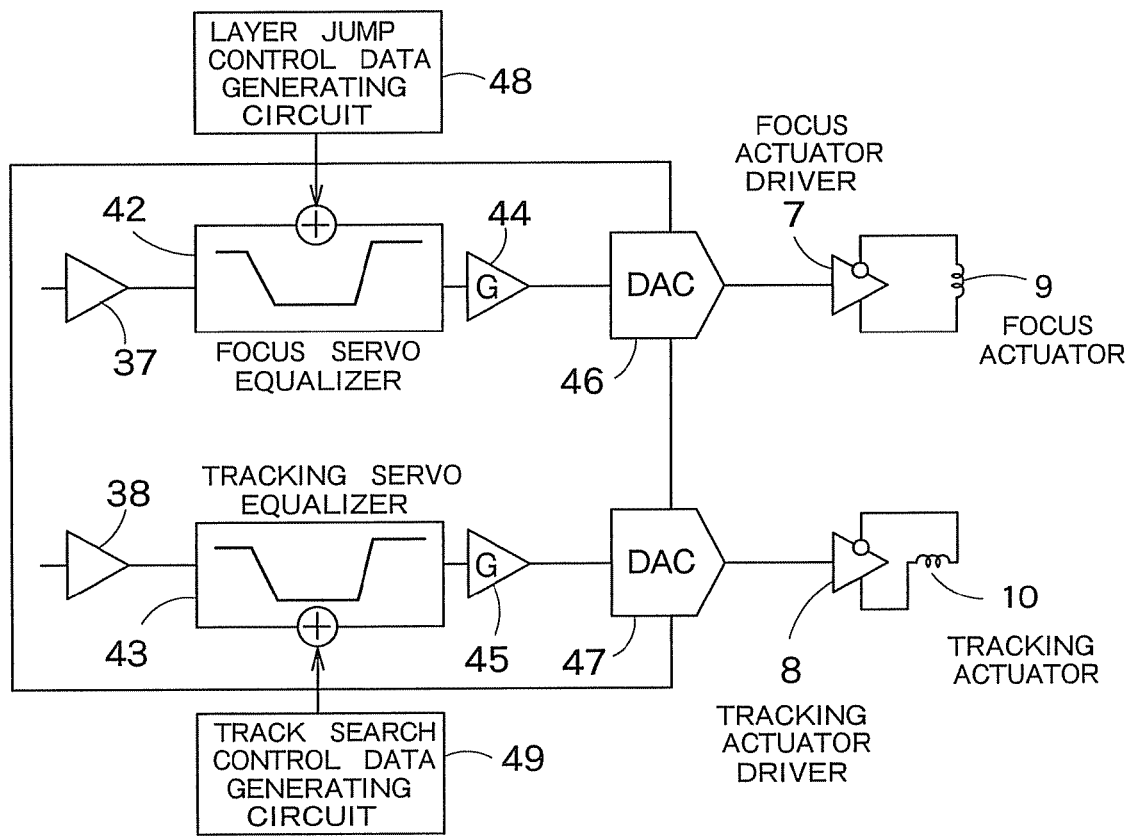
F I G. 7

SCHEMATIC STRUCTURE OF OPTICAL DISC DEVICE OF SECOND EMBODIMENT

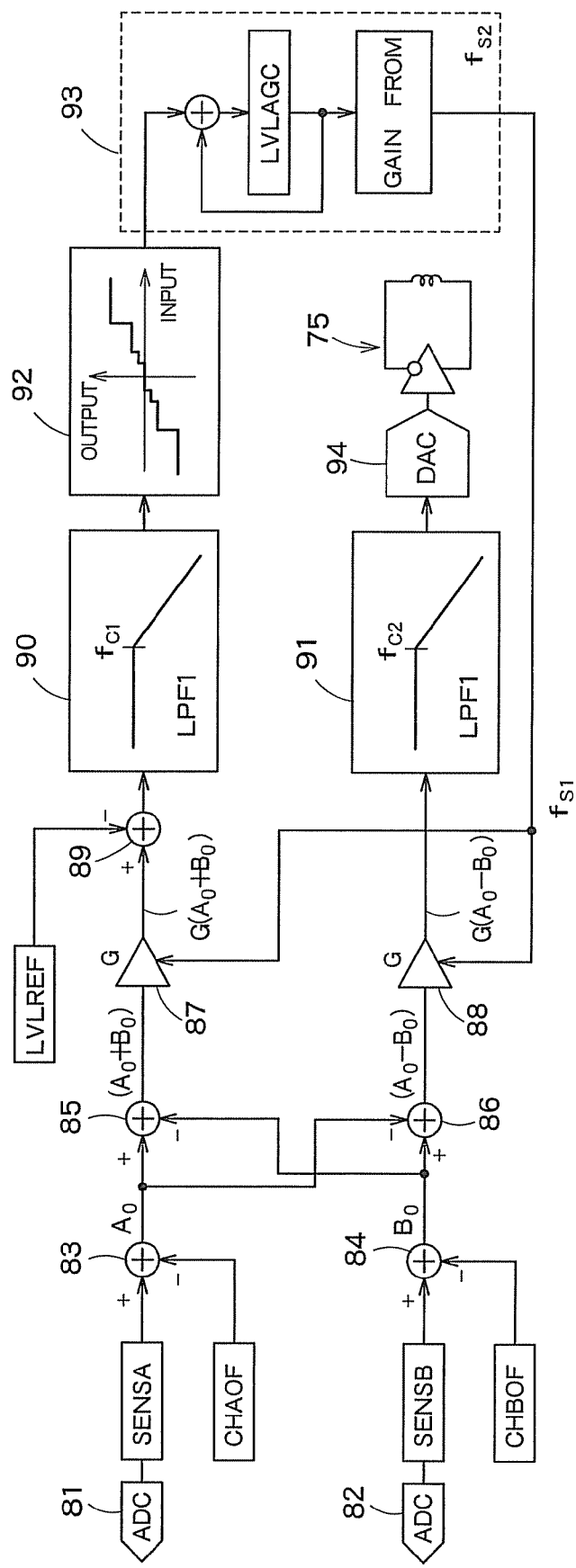
F I G. 11
INTERNAL CONFIGURATION OF TILT CORRECTION CIRCUIT 70

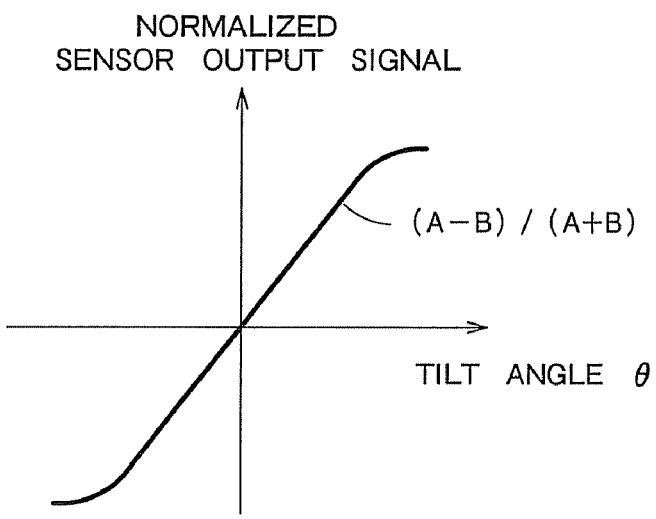
F I G. 13
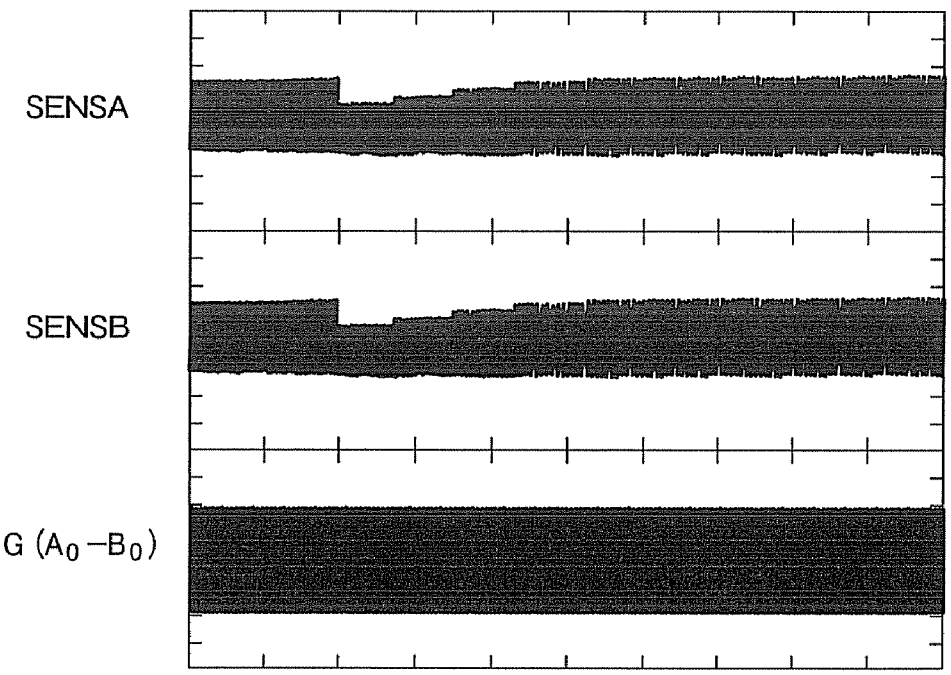
F I G. 14

OPTICAL DISC DRIVE DEVICE AND TILT CORRECTION DEVICE

CROSS REFERENCE TO RELATED APPLICATIONS

This application is based upon and claims the benefit of priority from the prior Japanese Patent Application No. 2007-328828, filed on Dec. 20, 2007, the entire contents of which are incorporated herein by reference.

BACKGROUND OF THE INVENTION

1. Field of the Invention

The present invention relates to an optical disc drive device that applies a focus servo and a tracking servo to drive an optical disc, and to a tilt correction device that corrects tilt of the optical disc.

2. Related Art

During playback and record operations of an optical disc, focus error signals and tracking error signals are detected and a focus servo and a tracking servo are applied to reduce the error signals. With the focus servo and the tracking servo, a focus actuator and a tracking actuator are driven.

In order to apply the focus servo and the tracking servo stably, it is preferable that the open loop gain does not deviate from a predetermined level assumed at design of the optical disc drive. In reality, however, due to variation in a return beam intensity of a return beam signal, there is a possibility that amplitudes (detection sensitivity) of the focus error signal and the tracking error signal at servo-OFF vary, and the open loop gain deviates from the predetermined value, so that it may be impossible to apply the servos stably.

There is also the problem that division process is required in order to control the detection sensitivities of the focus error signal and the tracking error signal to be constant, and as a result the scale of the hardware becomes large (see Japanese Patent Application Publication JP-A (Kokai) No. 2006-155891).

Similarly, when the tilt of the optical disks is corrected, a tilt error signal which is the output of the tilt sensor is detected, and a tilt servo is applied so as to reduce the tilt error signal. In this case too, since division process is required in order to control the detection sensitivity of the focus error signal and the tracking error signal to be constant, it would be difficult to reduce the scale of the hardware.

SUMMARY OF THE INVENTION

According to one aspect of the present invention, an optical disc drive device comprising:

an FE signal generator which generates a focus error signal;

a TE signal generator which generates a tracking error signal;

a return beam detector which detects a return beam reflected by an optical disc after irradiated by an optical pickup to generate a return beam level signal;

a return beam gain setting part which sets amplitude adjustment amount of the return beam level signal so that a signal level of the return beam level signal generated by the return beam detector coincides with a predetermined reference level;

an FE gain setting part which sets amplitude adjustment amount of the focus error signal in accordance with the signal level of the return beam level signal adjusted by the return beam gain setting part so that a signal amplitude of the focus error signal is constant; and a TE gain setting part which sets amplitude adjustment amount of the tracking error signal in accordance with the signal level of the return beam level signal adjusted by the return beam gain adjustment part so that a signal amplitude of the tracking error signal is constant.

According to the other aspect of the present invention, a tilt correction device comprising:

a first tilt sensor which irradiates the optical disc with a tilt detecting beam and detects a first reflected beam from the optical disc;

a second tilt sensor which irradiates the optical disc with a tilt detecting beam and detects a second reflected beam from the optical disc;

a return beam detector which detects a return beam level signal indicative of an adding signal of the first and second reflected beam signals;

a return beam gain setting part which sets amplitude adjustment amount of the return beam level signal so that a signal level of the return beam level signal coincides with a reference level;

a tilt error signal generator which detects a tilt error signal indicative of a difference signal between the first and second reflected signals; and a tilt error signal gain setting part which sets amplitude adjustment amount of the tilt error signal in accordance with the signal level of the return beam level signal so that detection sensitivity of the tilt error signal is constant.

According to the other aspect of the present invention, an optical disc drive device comprising:

an FE signal generator which generates a focus error signal;

a TE signal generator which generates a tracking error signal;

a return beam detector which detects a return beam reflected by an optical disc after irradiated by an optical pickup to generate a return beam level signal;

a return beam gain setting part which sets amplitude adjustment amount of the return beam level signal so that a signal level of the return beam level signal generated by the return beam detector coincides with a predetermined reference level;

an FE gain setting part which sets amplitude adjustment amount of the focus error signal in accordance with the signal level of the return beam level signal adjusted by the return beam gain setting part so that a signal amplitude of the focus error signal is constant;

a TE gain setting part which sets amplitude adjustment amount of the tracking error signal in accordance with the signal level of the return beam level signal adjusted by the return beam gain adjustment part so that a signal amplitude of the tracking error signal is constant; and a tilt correction part which detects a tilt of the optical disc, the tilt correction part includes:

a first tilt sensor which irradiates the optical disc with a tilt detecting beam and detects a first reflected beam from the optical disc;

a second tilt sensor which irradiates the optical disc with a tilt detecting beam and detects a second reflected beam from the optical disc;

a return beam detector which detects a return beam level signal indicative of an adding signal of the first and second reflected beam signals;

a return beam gain setting part which sets amplitude adjustment amount of the return beam level signal so that a signal level of the return beam level signal coincides with a reference level;

a tilt error signal generator which detects a tilt error signal indicative of a difference signal between the first and second reflected signals; and a tilt error signal gain setting part which sets amplitude adjustment amount of the tilt error signal in accordance with the signal level of the return beam level signal so that detection sensitivity of the tilt error signal is constant.

BRIEF DESCRIPTION OF THE DRAWINGS

FIGS. 4A and 4B are graphs showing a second correspondence between focus error data and tracking error data;

FIGS. 5A and 5B are graphs showing a third correspondence between focus error data and tracking error data;

FIGS. 6A and 6B are graphs showing a fourth correspondence between focus error data and tracking error data, and FIG. 6C are graphs showing sample measurements of error signal amplitude characteristics when error signal amplitude normalizing operation is OFF and ON;

FIG. 7 is a block diagram showing a detailed peripheral structure of a layer jump control data generating circuit 48 and a track search control data generating circuit 49;

FIG. 11 is a block diagram showing an example of an internal configuration of a tilt correction circuit 70;

FIG. 13 is a waveform diagram showing an example of the output signal of a second coefficient multiplier 88 in FIG. 11; and FIG. 14 is a signal waveform diagram showing first and second tilt sensor output data 81, 82 and the output signal of the second coefficient multiplier 88.

DETAILED DESCRIPTION OF THE INVENTION

Embodiments according to the present invention will now be explained with reference to the accompanying drawings.

First Embodiment

Figure 1:
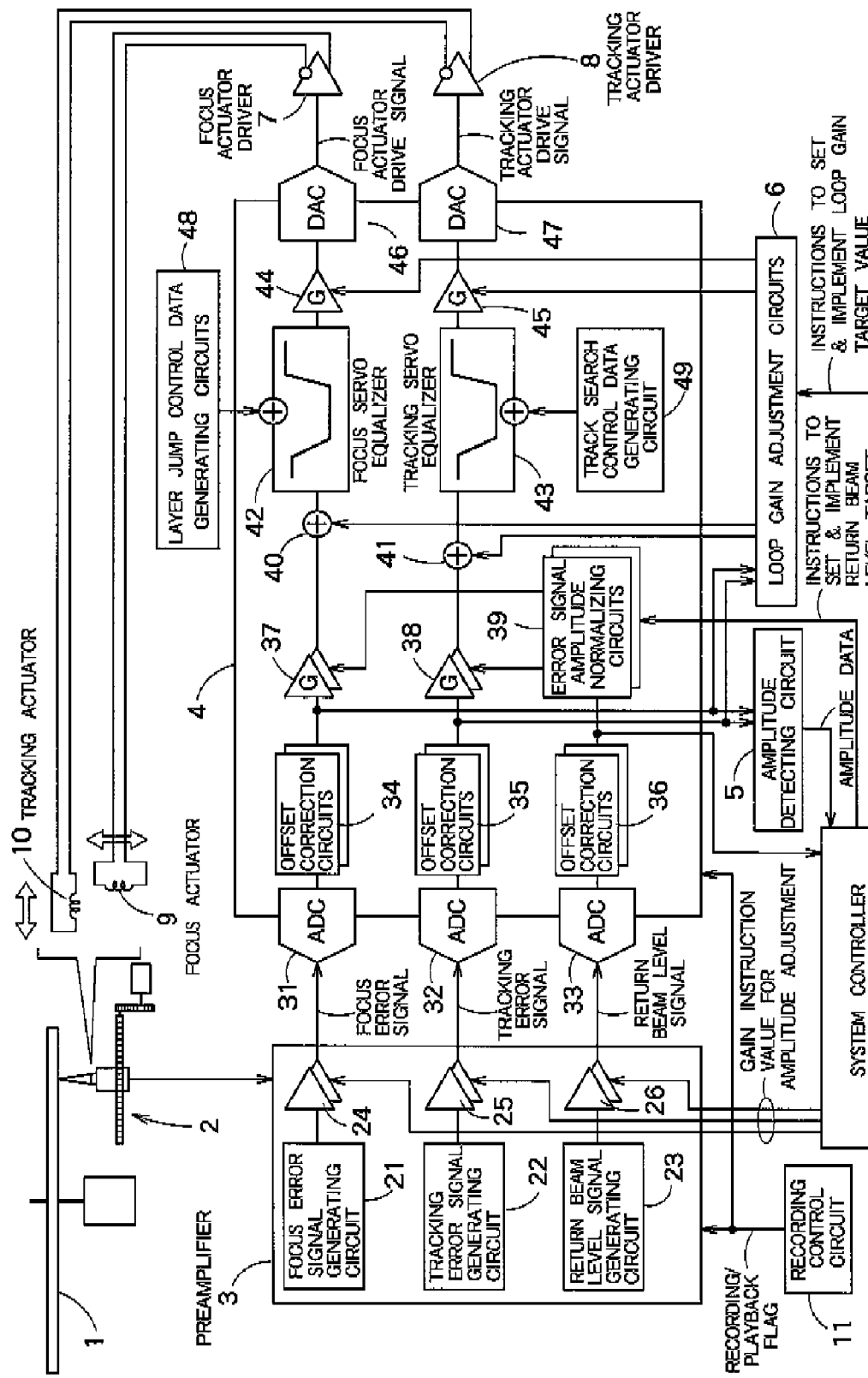
FIG. 1 is a block diagram showing a schematic structure of an optical disc drive device according to a first embodiment of the present invention.

FIG. 1 is a block diagram showing a schematic structure of an optical disc drive device according to a first embodiment of the present invention. The optical disc drive device in FIG. 1 includes a pickup 2 that irradiates an optical disc 1 with a beam and detects a return beam from the optical disc 1, a preamplifier 3, an actuator drive control circuit 4, an amplitude detecting circuit 5, a loop gain adjusting circuit 6, a focus actuator driver 7, a tracking actuator driver 8, a focus actuator 9, a tracking actuator 10, a recording control circuit 11, and a system controller 12.

The preamplifier 3 has an FE signal generating circuit (FE signal generator) 21 that generates focus error signals, a TE signal generating circuit (TE signal generator) 22 that generates tracking error signals, a return beam signal generating circuit (return beam detector) 23 that detects the return beam level signal, FE amplitude adjustment gain amplifiers 24 that adjust the gains of the focus error signals, TE amplitude adjustment gain amplifiers 25 that adjust the gains of the tracking error signals, and return beam amplitude adjustment gain amplifiers 26 that adjust the gains of the return beam level signals.

The actuator drive control circuit 4 has an FE ADC (first A/D converter) 31, a TE ADC (second A/D converter) 32, a return beam ADC 33, FE offset correcting circuits (second offset correction parts) 34, TE offset correcting circuits (third offset correction parts) 35, return beam offset correcting circuits (first offset correction parts) 36, FE amplitude normalizing coefficient multipliers (second gain correction parts) 37, TE amplitude normalizing coefficient multipliers (third gain correction parts) 38, error signal amplitude normalizing circuits 39, an FE adder 40, a TE adder 41, a focus servo equalizer 42, a tracking servo equalizer 43, a focus servo loop gain adjustment coefficient multiplier 44, a tracking servo loop gain adjustment coefficient multiplier 45, a focus actuator DAC (first D/A converter) 46, a tracking actuator DAC (second D/A converter) 47, a layer jump control data generating circuit (layer jump control data generator) 48 that generates layer jump control data for moving a beam spot of a read-out beam between different layers of the optical disc 1, and a track search control data generating circuit (track search control data generator) 49 that generates track search control data for moving the beam spot in the radial direction of the optical disc 1.

The pickup 2 detects the reflected beam signal from the optical disc 1 and supplies it to the preamplifier 3. The FE signal generating circuit 21 and the TE signal generating circuit 22 inside the preamplifier 3 generate the focus error signals and the tracking error signals based on the reflected beam signals, respectively. The gains of the focus error signals and the tracking error signals are adjusted, then these error signals are converted into digital data (focus error data and tracking error data) by the FE ADC 31 and the TE ADC 32, respectively.

Offsets of the focus error data and the tracking error data are canceled out by the FE offset correcting circuits 34 and the TE offset correcting circuits 35, respectively, inside of the actuator drive control circuits 4. And then, The output data of the FE offset correcting circuits 34 and the TE offset correcting circuits 35 are multiplied with any desired factor by the FE amplitude normalizing coefficient multipliers 37 and the TE amplitude normalizing coefficient multipliers 38, respectively, using respective specific error signal amplitude normalizing coefficients. The multiplied focus error data and tracking error data are input to the focus servo equalizer 42 and the tracking servo equalizer 43, respectively, in order to compensate gains and phases of their data.

Subsequently, the focus error data and the tracking error data are multiplied with any desired factor by the focus servo loop gain adjustment coefficient multiplier 44 and the tracking servo loop gain adjustment coefficient multiplier 45, respectively, using respective specific actuator drive sensitivity correction coefficients, and then are converted into analog signals (focus actuator drive signals and tracking actuator drive signals) by the focus actuator DAC 46 and the tracking actuator DAC 47, respectively.

The focus actuator drive signals and the tracking actuator drive signals are input to the focus actuator driver 7 and the tracking actuator driver 8, respectively. The focus actuator 9 and the tracking actuator 10 are driven by means of the outputs of these drivers. Thereby, an objective lens is driven in the focus direction and the tracking direction, and the focus servo and the tracking servo are applied.

There is one pair each of the FE amplitude adjustment gain amplifiers 24, the TE amplitude adjustment gain amplifiers 25 and the return beam amplitude adjustment gain amplifiers 26 inside the preamplifier 3. One of each pair is used for adjusting gain during playback operation, and the other is used for adjusting gain during record operation. The gain settings for these amplifiers are made by means of instructions from the system controller 12. The outputs of these pairs of amplifiers are selected automatically by means of a recording/playback flag detected by the recording control circuit 11.

Similarly, there is one pair each of the FE offset correcting circuits 34, TE offset correcting circuits 35 and return beam offset correction circuits 36 inside the actuator drive control circuits 4. One of each pair performs offset adjustment after gain adjustment during playback operation, and the other performs offset adjustment after gain adjustment during record operation. The outputs of these pairs of offset correction circuits are selected automatically by means of the recording/playback flag detected by the recording control circuits 11.

The offset values for these offset correction circuits, more precisely the offset values for playback operation and those for record operation, may be individually measured and stored in advance.

The FE offset correcting circuits 34 and the TE offset correcting circuits 35 can switch whether the offset value at playback operation or the offset value at record operation is used among the stored offset values in accordance with the recording/playback flag sent from the recording control circuit 11.

The amplitude detecting circuit 5 has a built-in peak bottom detection circuit that is not shown in the drawings. Focus searches are carried out after the peak bottom detection circuit has been reset. When notification is received from the system controller 12 that a focus search has been completed, the focus error signal amplitude is calculated based on the peak hold data and the bottom hold data detected by the peak bottom detection circuit. The tracking error signal amplitude is calculated by carrying out similar detection, at a state of the focus servo-ON and the tracking servo-OFF. Thus, in order to measure the amplitudes of the focus error signal and the tracking error signal, at least one servo has to be turned off. Therefore, the measurement cannot be carried out during reading or writing operation.

The loop gain adjustment circuit 6 sets in advance, in accordance with instructions from the system controller 12, the frequency and amplitude of a disturbance signal for loop gain adjustment operation, and the phase at the disturbance frequency for the closed loop characteristics targeted at design of the optical disc drive device. When the system controller 12 subsequently gives to the loop gain adjustment circuit 6 an instruction for adjustment operation of the loop gain, the loop gain adjustment circuit 6 measures the phase difference between the focus error data and the disturbance signal, or between the tracking error data and the disturbance signal, while inputting the disturbance signal to the servo loop. Then, based on the measured phase difference, the loop gain adjustment circuit 6 adjusts the loop gain by performing variable control of the loop gain adjustment coefficient. Since the disturbance signal is injected into the servo loops during the loop gain adjustment operation, the loop gain adjustment operation cannot be carried out during reading operation or writing operation, and is carried out only when the optical disc 1 is simply being traced.

Figure 2:
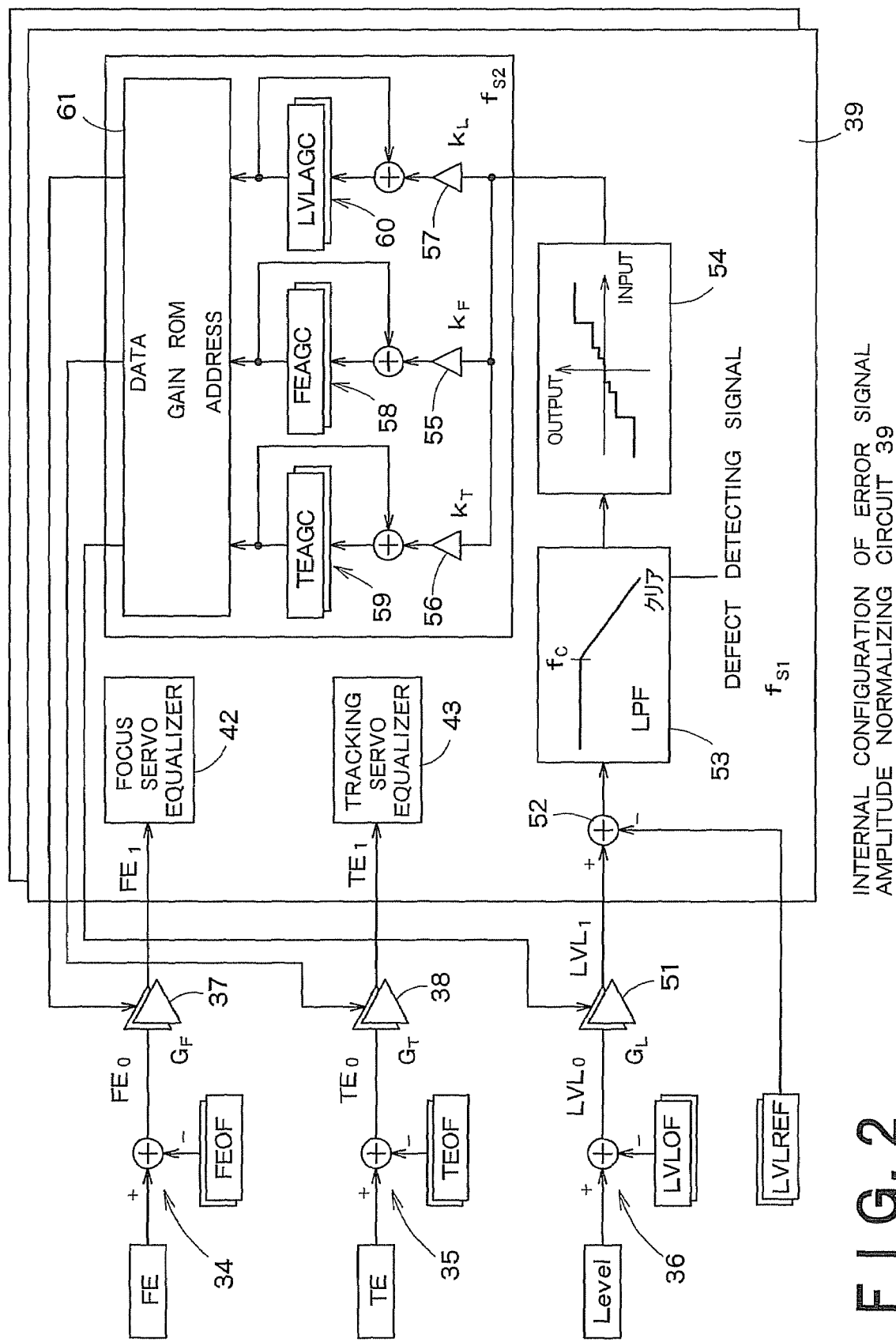
FIG. 2 is a block diagram showing an example of an internal configuration of an error signal amplitude normalizing circuits 39 in FIG. 1.

FIG. 2 is a block diagram showing an example of an internal configuration of the error signal amplitude normalizing circuits 39 in FIG. 1. The error signal amplitude normalizing circuits 39 in FIG. 2 have return beam adjustment coefficient multipliers (first gain correction part) 51 that multiplies the return beam level data by an adjustment coefficient $G_L$, a reference subtractor 52 that detects the difference data between the output signal of the return beam coefficient multiplier 51 and a reference level LVLREF, a low pass filter 53 that eliminates high frequency noise from the difference data, a decoder 54 that controls so that the amplitude of the data that passes through the low pass filter 53 does not change drastically, an FE adjustment coefficient multiplier (second amplitude adjustment part) 55 that multiplies the output of the decoder 54 by an adjustment coefficient $K_F$, a TE adjustment coefficient multiplier (third amplitude adjustment part) 56 that multiplies the output of the decoder 54 by an adjustment coefficient $K_T$, a return beam adjustment coefficient multiplier (first amplitude adjustment part) 57 that multiplies the output of the decoder 54 by an adjustment coefficient $K_L$, an FE cumulative adder (second cumulative adder) 58 that cumulatively sums up the output of the FE adjustment coefficient multiplier 55, a TE cumulative adder (third cumulative adder) 59 that cumulatively sums up the output of the TE adjustment coefficient multiplier 56, a return beam cumulative adder (first cumulative adder) 60 that cumulatively sums up the output of the return beam adjustment coefficient multiplier 57, and a gain ROM (gain amount setting part) 61 that generates adjustment coefficients $G_F$, $G_T$, and $G_L$.

The return beam adjustment coefficient multiplier 57 and the return beam cumulative adder 60 correspond to a return beam gain setting part, the FE adjustment coefficient multiplier 55 and FE cumulative adder 58 correspond to a FE gain setting part, and the TE adjustment coefficient multiplier 56 and TE cumulative adder 59 correspond to a TE gain setting part.

In FIG. 2, the offset-corrected focus error data, tracking error data and return beam level data are labeled $FE_0$, $TE_0$ and $LVL_0$, respectively.

The offset-corrected (canceled) return beam level data $LVL_0$ is multiplied by the amplitude adjustment coefficient $G_L$. The reference subtractor 52 outputs the difference data between $G_L \cdot LVL_0$ and the predetermined reference level LVLREF. After passing through the low pass filter 53, where the high frequency noise is eliminated, this difference data is input to the decoder 54. The decoder 54 switches in steps the level so that the difference data level that passes through the low pass filter 53 does not change drastically.

The output data of the decoder 54 is input to the FE adjustment coefficient multiplier 55, the TE adjustment coefficient multiplier 56, and the return beam adjustment coefficient multiplier 57. These multipliers multiply the output data of the decoder 54 by preset respective amplitude adjustment coefficients $k_T$, $k_F$, and $k_L$.

The FE cumulative adder 58, the TE cumulative adder 59, and the return beam cumulative adder 60 cumulatively sum up the output data of the respective multipliers. The output data of these cumulative adders are input to the gain ROM 61, from which values corresponding to the output level of each cumulative adder are read out as amplitude adjustment coefficients $G_F$, $G_T$, and $G_L$.

Thus, the return beam amplitude adjustment coefficient $G_L$ is automatically adjusted so that $LVL_0 \times G_L$ coincides with the reference level LVLREF, as in the equation (1) below.

$$LVL_0 \times G_L = LVL_1 = LVLREF \tag{1}$$

The FE cumulative adder 58, the TE cumulative adder 59, and the return beam cumulative adder 60 perform cumulative adding during a preset error signal amplitude normalizing operation period, and the cumulative adding values are stored in the respective registers inside the cumulative adders. In the case where the system controller 12 sets the amplitude adjustment coefficients $k_T$, $k_F$, and $k_L$ in advance, the relation in the equation (2) below will be established with respect to a cumulative adding value of the FE cumulative adder 58 $\Delta FEAGC$, a cumulative adding value of the TE cumulative adder 59 $\Delta TEAGC$, and a cumulative adding value of the return beam cumulative adder 60 $\Delta LVLAGC$, on the one hand, and the amplitude adjustment coefficients $k_T$, $k_F$, and $k_L$ on the other.

$$\frac{\Delta LVLAGC}{k_L} = \frac{\Delta FEAGC}{k_F} = \frac{\Delta TEAGC}{k_T} \tag{2}$$

The offset-corrected focus error data $FE_0$ and tracking error data $TE_0$ are multiplied by the factors $G_F$ and $G_T$ respectively, and then input to the focus servo equalizer 42 and the tracking servo equalizer 43, respectively.

$G_F$ and $G_T$ are controlled by means of the cumulative adding values $\Delta FEAGC$ and $\Delta TEAGC$ of the FE cumulative adder 58 and the TE cumulative adder 59, respectively.

Because the relation in the equation (2) above is established, it is possible to vary the amplitudes of the focus error data and the tracking error data according to the return beam level.

The system controller 12 can perform reading from and writing into the respective registers of the FE cumulative adder 58, the TE cumulative adder 59, and the return beam cumulative adder 60, and can store initial values in the registers before the error signal amplitude normalizing operation starts.

During the error signal amplitude normalizing operation period, the return beam difference data is periodically detected to perform cumulative adding process. The period for the cumulative adding process can be set as desired in accordance with the cutoff frequency fc of the low pass filter 53.

The offset correction values FEOF, TEOF, and LVLOF for the focus error data, tracking error data and return beam level data, the return beam level target level LVLREF, the amplitude adjustment coefficients $G_L$, $G_F$, and $G_T$, and the cumulative adding values FEAGC, TEAGC, and LVLAGC are set as separate values, respectively, at the playback operation period and the record operation period. Switching between such settings is performed automatically by means of the recording/playback flag sent from the recording control circuit 11. As described above, there is one pair each of the FE amplitude normalizing coefficient multipliers 37, the TE amplitude normalizing coefficient multipliers 38 and the error signal amplitude normalizing circuits. One of each pair is used for playback operation, and the other is used for record operation. The output of the FE amplitude normalizing coefficient multiplier 37 and the TE amplitude normalizing coefficient multiplier 38 selected based on the recording/playback flag are supplied to the FE adder 40 and the TE adder 41, respectively As an example, the error signal amplitude normalizing operation in the case where the characteristics of the gain ROM 61 are expressed by the equations (3) to (5) below will now be described.

$$G_F = 10^{\wedge}\left(\frac{d \times FEAGC}{20}\right) \tag{3}$$

$$G_T = 10^{\wedge}\left(\frac{d \times TEAGC}{20}\right) \tag{4}$$

$$G_L = 10^{\wedge}\left(\frac{d \times LVLAGC}{20}\right) \tag{5}$$

The equation (1) is established under normal conditions. When it is assumed that the initial value stored in the register of the return beam cumulative adder 60 is denoted as $LVLAGC_0$, and the cumulative adding value in the case where the error signal amplitude normalizing operation is completed is denoted as $LVLAGCs$, the equation (6) below will be established.

$$\Delta LVLAGC = LVLAGCs - LVLACG_0 \tag{6}$$

Likewise, when it is assumed that the initial values stored in the registers of the FE cumulative adder 58 and the TE cumulative adder 59 are denoted as $FEAGC_0$ and $TEAGC_0$, respectively, and the cumulative adding values in the case where the error signal amplitude normalizing operation is completed are denoted as FEAGCs and TEAGCs, respectively, the equations (7) and (8) below will be established.

$$\Delta FEAGC = FEAGCs - FEACG_0 \tag{7}$$

$$\Delta TEAGC = TEAGCs - TEACG_0 \tag{8}$$

If the system controller 12 sets zero for the initial value $LVLACG_0$, the equation (9) below will be established.

$$LVLAGCs = \Delta LVLAGC, \tag{9}$$
$$\text{and } \frac{\Delta LVAGC}{k_L} = \frac{\Delta FEAGC}{k_F} = \frac{\Delta TEAGC}{k_T}$$

Hence, the cumulative adding values FEAGC and TEAGC of the FE cumulative adder 58 and TE cumulative adder 59 in the case where the error signal amplitude normalizing operation is completed are expressed by the equations (10) and (11) below, respectively.

$$FEAGC_s = \frac{k_F}{k_L} \times LVLAGC_s + FEAGC_0 \tag{10}$$

$$TEAGC_s = \frac{k_T}{k_L} \times LVLAGC_s + TEAGC_0 \tag{11}$$

From the equations (1) and (3), the equation (12) below can be derived.

$$G_L = \frac{LVLFEF}{LVL_0} = 10^{\wedge}\left(\frac{d \times LVLAGC}{20}\right) \tag{12}$$

By modifying the equation (12), the equation (13) below is obtained.

$$LVLAGC_s = \frac{20}{d} \times \log\left(\frac{LVLREF}{LVL_0}\right) \quad (13)$$

The normalized focus error data $FE_1$ and tracking error data $TE_1$ are expressed by the equations (14) and (15) below, respectively.

$$FE_1 = 10^\wedge\left\{\frac{k_F}{k_L} \times \log\left(\frac{LVLREF}{LVL_0}\right)\right\} \times 10^\wedge\left(\frac{d}{20} \times FEAGC_0\right) \times FE_0 \quad (14)$$

$$TE_1 = 10^\wedge\left\{\frac{k_T}{k_L} \times \log\left(\frac{LVLREF}{LVL_0}\right)\right\} \times 10^\wedge\left(\frac{d}{20} \times TEAGC_0\right) \times TE_0 \quad (15)$$

When the error signal amplitude normalizing operation is OFF, four properties shown in FIGS. 3A, 4A, 5A, and 6A are conceivable for the focus error data and the tracking error data.

Figure 3A:
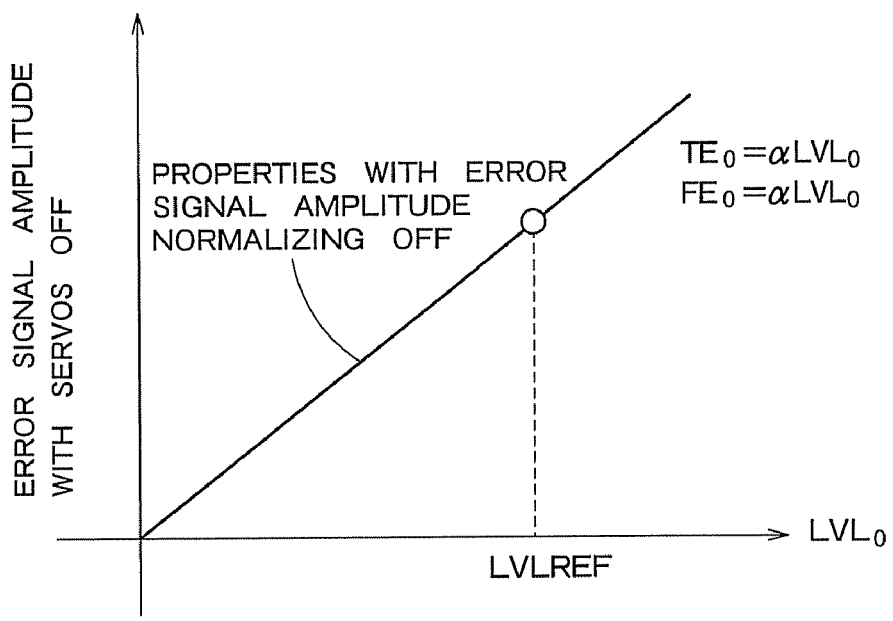
FIGS. 3A and 3B are graphs showing a first correspondence between focus error data and tracking error data.

FIG. 3A shows a graph of a first correspondence between the focus error data and tracking error data in the case where the amplitudes of both error data increase, with the same gradient, proportionally to the amplitude of the return beam level data. In FIGS. 3A, 4A, 5A and 6A, the horizontal axis represents the return beam level data, and the vertical axis represents the amplitude of the focus error data and the tracking error data when the servos are OFF.

FIGS. 4A and 5A show a graph of a second correspondence between the focus error data and tracking error data in the case where both error signals increase proportionally to the amplitude of the return beam level data, but the gradients of the focus error data and the tracking error data differ from each other.

FIG. 6A shows a graph of a third correspondence between the focus error data and tracking error data in the case where the amplitude of the tracking error data is constant, but the amplitude of the focus error data increases proportionally to the amplitude of the return beam level data. FIG. 6A shows a graph of a fourth correspondence between the focus error data and tracking error data in the case where the tracking error data are generated via a differential phase detection (DPD) method.

The graph shown in FIG. 3A are for the case where the gain setting of the preamplifier 3 is set so that the amplitude of the focus error signal when the servo is OFF is equal to that of the tracking error signal when the servo is OFF, whereas the graphs shown FIGS. 4A and 5A are for the case where the amplitudes of the focus error signal and the tracking error signal is set so that such amplitudes are unbalanced.

When the graph as shown in FIG. 3A is obtained, the system controller 12 controls the amplitude adjustment coefficients to be $k_T=k_F=k_L$, and controls the cumulative adding values to be $FEAGC_0=TEAGC_0=0$, before starting the error signal amplitude normalizing operation. Thereby, during the error signal amplitude normalizing operation period, normalization will take place as expressed in the equations (16) and (17) below.

$$FE_1 = \frac{LVLREF}{LVL_0} \times FE_0 = \alpha \times LVLREF \quad (16)$$

$$TE_1 = \frac{LVLREF}{LVL_0} \times TE_0 = \alpha \times LVLREF \quad (17)$$

Figure 3B:
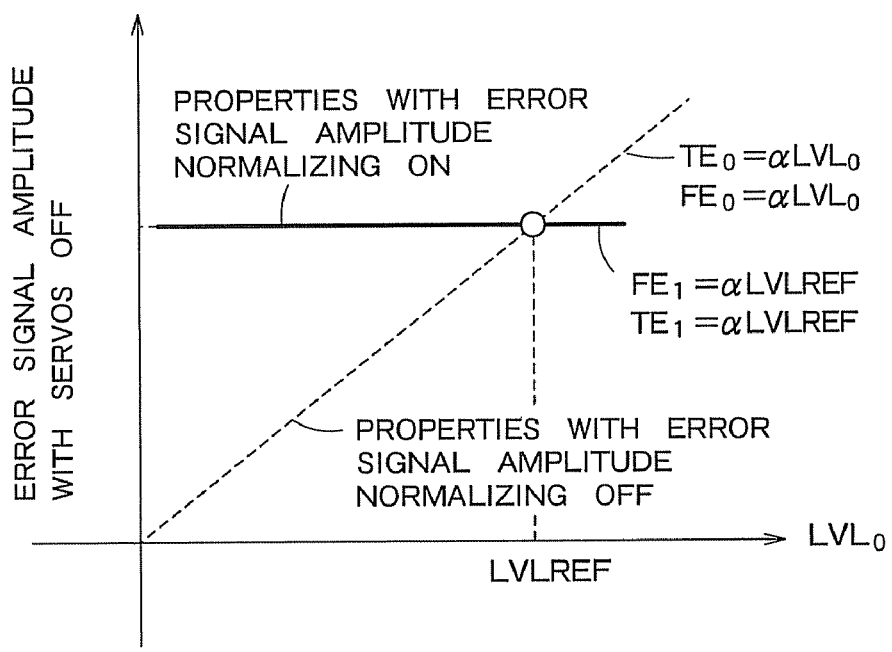

As a result, the focus error data and the tracking error data are expressed by a graph as shown in FIG. 3B. More precisely, in such a case, the error signal amplitudes (detection sensitivities) for both error data coincide with each other when the servos are OFF, regardless of the amplitude of the return beam level data.

When the graph as shown in FIG. 4A is obtained, on the other hand, the system controller 12 controls the amplitude adjustment coefficients to be $k_T=k_F=k_L$, and controls the cumulative adding values to be $FEAGC_0=TEAGC_0=0$. Thereby, during the error signal amplitude normalizing operation period, normalization will take place as in the equations (18) and (19) below.

$$FE_1 = \frac{LVLREF}{LVL_0} \times FE_0 = \alpha \times LVLREF \quad (18)$$

$$TE_1 = \frac{LVLREF}{LVL_0} \times TE_0 = \beta \times LVLREF \quad (19)$$

As a result, the focus error data and the tracking error data are expressed by a graph as shown in FIG. 4B. More precisely, in such a case, the error signal amplitudes for both error data coincide with each other when the servos are OFF, regardless of the amplitude of the return beam level data, but the amplitude of the focus error data when the servos are OFF and that of the tracking error data when the servos are OFF will differ in values. Thus, the unbalance between the focus error data and the tracking error data will still be present.

It is possible to eliminate this unbalance. To do so, the system controller 12 controls the amplitude adjustment coefficients to be $k_T=k_F=k_L$ for amplitude adjustment coefficients, and controls the cumulative adding value to be $FEAGC_0=0$, before starting the error signal amplitude normalizing operation. Thereby, during error signal amplitude normalizing operation period, normalization will take place as in the equations (20) and (21) below.

$$FE_1 = \frac{LVLREF}{LVL_0} \times FE_0 = \alpha \times LVLREF \quad (20)$$

$$TE_1 = \frac{LVLREF}{LVL_0} \times TE_0 \times 10^\wedge\left\{\frac{d}{20} \times TEAGC_0\right\} \quad (21)$$
$$= \beta \times LVLREF \times 10^\wedge\left\{\frac{d}{20} \times TEAGC_0\right\}$$

When the system controller 12 substitutes a value expressed by the equation (22) below for $TGADD_0$ in the right side of the equation (21) above, the equation (23) below can be obtained.

$$TEAGC_0 = \frac{20}{d} \times \log\left(\frac{\alpha}{\beta}\right) \quad (22)$$

$$TE_1 = \frac{LVLREF}{LVL_0} \times TE_0 \times 10^\wedge\left\{\frac{d}{20} \times TEAGC_0\right\} = \alpha \times LVLREF \quad (23)$$

As can be seen from the equations (20) and (23), the focus error data amplitude when the servos are OFF is equal to the tracking error data amplitude when the servos are OFF. In this case, a graph as shown in FIG. 5B would be obtained.

When the graph as shown in FIG. 6A is obtained, on the other hand, the system controller 12 controls the amplitude adjustment coefficients to be $k_F=k_L$ and $k_T=0$, and controls the cumulative adding values to be $FEAGC_0=TEAGC_0=0$, before starting the error signal amplitude normalizing operation. Thereby, during the error signal amplitude normalizing operation period, normalization will take place as in the equations (24) and (25) below.

$$FE_1 = \frac{LVLREF}{LVL_0} \times FE_0 = \alpha \times LVLREF \qquad (24)$$

$$TE1 = TE0 \qquad (25)$$

As a result, the focus error data and the tracking error data have properties such as in FIG. 6B.

FIG. 6C is a graph obtained by plotting actual measurements of the focus error data and the tracking error data when the graph in FIG. 6A is obtained. As can be seen from the figure, the graph are similar to those in FIG. 6B, both for the case where the error signal amplitude normalizing operation is OFF and the case where it is ON.

Thus, the amplitude adjustment coefficients $k_T$, $k_F$, $k_L$, and the initial cumulative adding values $FEAGC_0$ and $TEAGC_0$ to be set differ depending on the properties of the focus error data and the tracking error data. Hence, the properties of both error signals must be detected at design and development of the optical disc drive device, and the system controller 12 must set the amplitude adjustment coefficients and the initial cumulative adding values that suit the detected properties.

It is to be noted that since the system controller 12 can set the amplitude adjustment coefficients $k_T$, $k_F$, $k_L$, and the initial cumulative adding values $FEAGC_0$ and $TEAGC_0$ as desired, the amplitude adjustment coefficients and the initial cumulative adding values can be used even in cases where the error signal amplitudes and the return beam level are not in a 1:1 relation. The system controller 12 also can take into consideration differences in error generation methods, differences in laser emission patterns during recording, and the like differences.

If the amplitude adjustment coefficients $k_T$, $k_F$, $k_L$, and the initial cumulative adding values $FEAGC_0$ and $TEAGC_0$ are determined at design and development of the optical disc drive device, then subsequently the amplitudes of both error signals can be normalized automatically in accordance with the return beam level, while the optical disc 1 is driven, even though the servos are ON. This means that both the error signal amplitudes can be normalized during data reading and during record operation without the need to turn off the servos so as to measure the error signal amplitudes at a state of the servo-OFF. More precisely, with this embodiment, it is possible, with the servo-ON, to control the error signal amplitudes (detection sensitivities) with the servo-OFF to be roughly constant.

With this embodiment, variation in the sensitivity of the focus actuator 9 when layer jumping is carried out, and variation in the sensitivity of the tracking actuator 10 when a track searching is performed, can be reduced.

FIG. 7 is a block diagram showing the detailed peripheral structure of the layer jump control data generating circuit 48 and the track search control data generating circuit 49. As shown in FIG. 7, the focus servo equalizer (FE servo part) 42 controls the gain and phase of the focus servo loop. Likewise, the tracking servo equalizer (TE servo part) 43 controls the gain and phase of the tracking servo loop.

The gain coefficient that the focus servo loop gain adjustment coefficient multiplier (focus servo amplitude adjustment part) 44 connected at the rear side of the focus servo equalizer 42 uses for multiplication, and the gain coefficient that the tracking servo loop gain adjustment coefficient multiplier (tracking servo amplitude adjustment part) 45 connected at the rear side of the tracking servo equalizer 43 uses for multiplication, are set by the loop gain adjustment circuit 6.

On the other hand, the focus error signal amplitude is normalized by the FE amplitude normalizing coefficient multipliers 37 prior to the focus servo equalizer 42, and as a result, the focus servo loop gain adjustment coefficient multiplier 44 corrects variation in the sensitivity of the focus actuator 9. Likewise, the tracking error signal amplitude is normalized by the TE amplitude normalizing coefficient multipliers 38 prior to the tracking servo equalizer 43, and as a result, the tracking servo loop gain adjustment coefficient multiplier 45 corrects variation in the sensitivity of the tracking actuator 10. The layer jump control data generating circuit 48 is disposed prior to the focus servo loop gain adjustment coefficient multiplier 44, and likewise the track search control data generating circuit 49 is disposed prior to the tracking servo loop gain adjustment coefficient multiplier 45. Thereby, drive sensitivity for the focus actuator 9 and the tracking actuator 10 can be adjusted by taking into consideration the layer jump control data and the track search control data, thereby reducing variation in the drive sensitivity of the focus actuator 9 during layer jumping and variation in the drive sensitivity of the tracking actuator 10 during track searching, and hence realizing stable layer jumping and track searching.

Figure 8A:
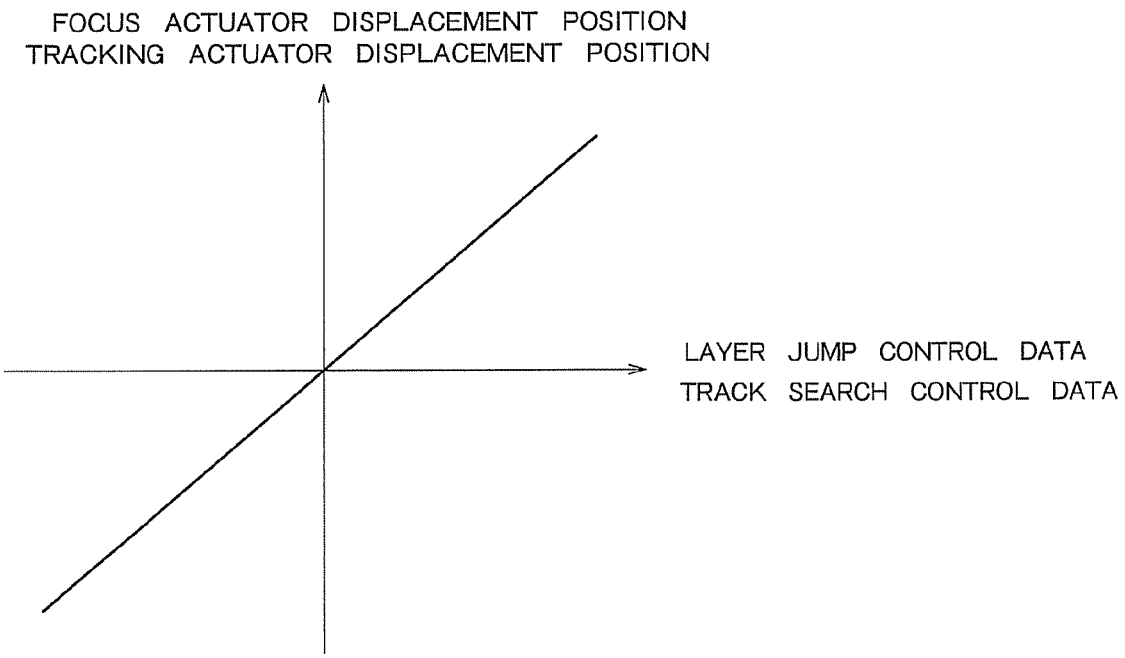
FIG. 8A is a graph showing a property of the displacement amounts of a focus actuator 9 and a tracking actuator 10 versus layer jump control data and track search control data.
Figure 8B:
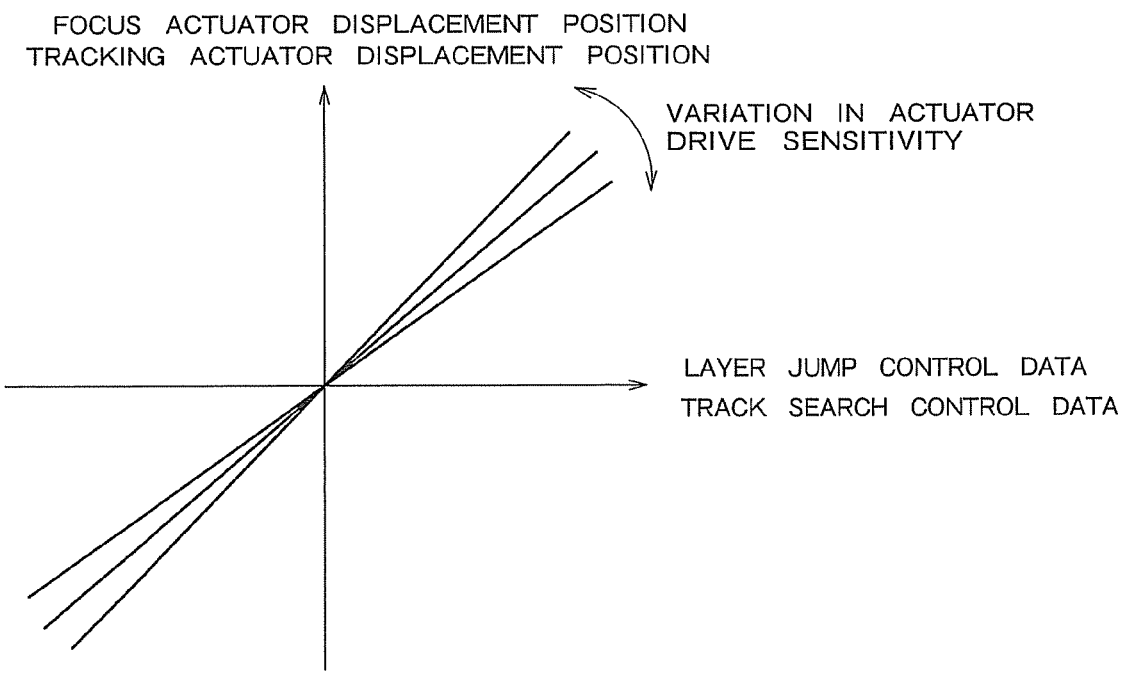
FIG. 8B is a graph showing a property of the related art.

FIG. 8A is a graph showing a property of the displacement amounts of the focus actuator 9 and the tracking actuator 10 versus the layer jump control data and tracking search control data. FIG. 8B is a graph showing a property of the related art.

In the related art, the FE amplitude normalizing coefficient multipliers 37 and TE amplitude normalizing coefficient multipliers 38 are not present, and the loop gain adjustment circuit 6 corrects the error signal detecting sensitivities and variation in the actuator drive sensitivities with a single correction coefficient. Also, since the conventional loop gain adjustment coefficient multipliers 44 and 45 have been disposed prior to the focus servo equalizer 42 and the tracking servo equalizer 43, respectively, it was impossible to reduce the actuator drive sensitivity variation.

Incidentally, the low pass filter 53 shown in FIG. 2 can clear the internal data when operational abnormalities are detected during defect detecting period. This makes it possible to stop error signal normalizing operation temporarily when a defect is detected. Thereby, reliability is improved.

Thus, with the First Embodiment, the error signal amplitude normalizing circuits 39 is provided, and the amplitude adjustment coefficients $k_T$, $k_F$, $k_L$, and the initial cumulative adding values $FEAGC_0$ and $TEAGC_0$ are determined in the stage of design and development of the optical disc drive device, according to the properties of the focus error data and the tracking error data. Therefore, while the optical disc drive device is operating (while the servos are ON), the signal amplitudes (detection sensitivities) of the focus error data and the tracking error data at the servo-OFF can be automatically controlled to be constant.

Also, division process is unnecessary for adjustment of the signal amplitudes of the focus error data and the tracking error data, and therefore the hardware configuration can be simplified.

Further, because the processing multiplied by the amplitude adjustment coefficients is performed on the focus error data and the tracking error data after offset correction, there will be no danger that the offset varies, and no need to re-acquire the offset correction data, even after both error signal amplitudes are normalized.

Also, because the focus servo loop gain adjustment coefficient multiplier 44 and the tracking servo loop gain adjustment coefficient multiplier 45 are disposed at the rear side of the focus servo equalizer 42 and the tracking servo equalizer 43, it is possible to perform correction for reducing variation in the drive sensitivity of the focus actuator 9 and the tracking actuator 10 can be executed even when layer jumping or track searching is performed.

Second Embodiment

Whereas one of characteristic features in the First Embodiment is in that no division process is performed for normalization processing of the focus error signal and tracking error signal amplitudes. On the contrary, in the Second Embodiment, one of the characteristic features is in that no division process is performed for normalization processing of the tilt error signal amplitude when tilt correction of the optical disc 1 is implemented.

Figure 9:
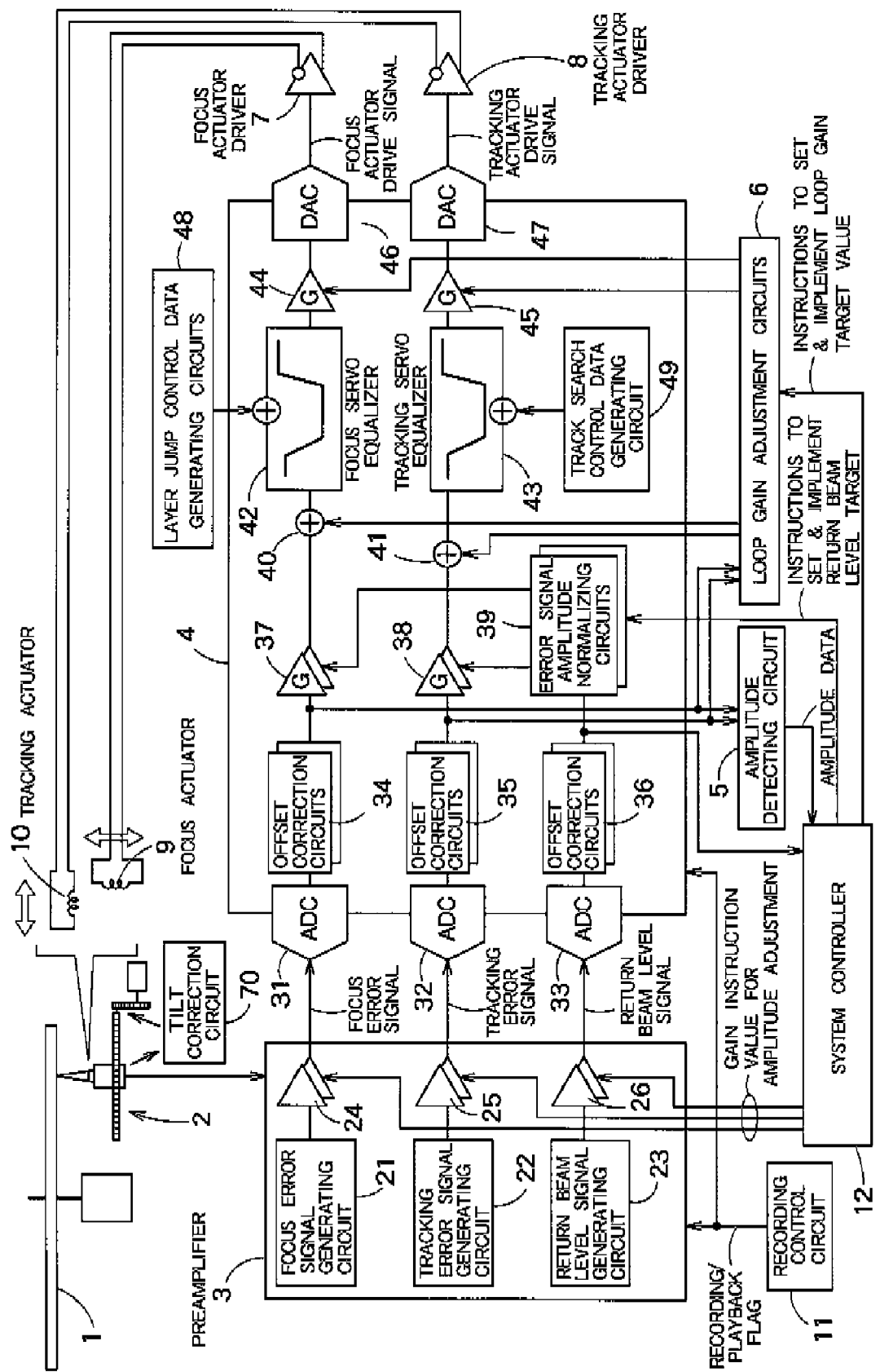
FIG. 9 is a block diagram showing s schematic structure of an optical disc drive device according to a second embodiment of the present invention.

FIG. 9 is a block diagram showing the schematic structure of an optical disc drive device according to the Second Embodiment of the present invention. The same reference numerals are attached to constituents in FIG. 9 common to those in FIG. 1, and hereinafter, differences from FIG. 1 will mainly be described.

The optical disc drive device in FIG. 9 has a tilt correction circuit 70 in addition to the configuration in FIG. 1. This tilt correction circuit 70 in FIG. 9 performs drive control of the tilt actuator so that the beam from the pickup 2 focuses perpendicularly onto the surface of the optical disc 1.

Figure 10:
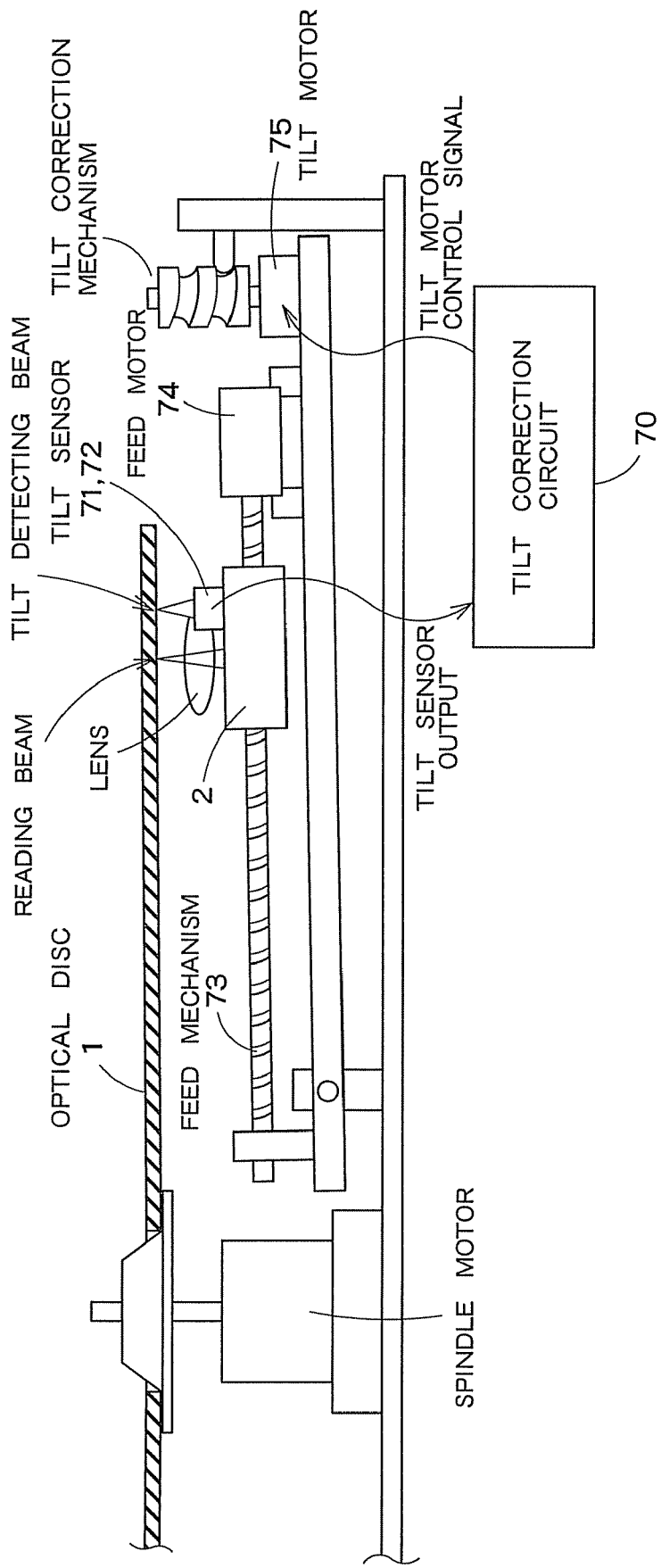
FIG. 10 is a detailed structure of a tilt actuator.

FIG. 10 is the detailed structure of the tilt actuator. The tilt actuator in FIG. 10 has a first and second tilt sensors 71, 72 placed on the pickup 2, a feed mechanism 73 that moves the pickup 2 in the disc surface direction, a feed motor 74, a tilt correction mechanism and a tilt motor 75 for adjusting the tilt.

FIG. 11 is a block diagram showing an example of an internal configuration of the tilt correction circuit 70. The tilt correction circuit 70 in FIG. 11 has a first ADC (first A/D converter) 81 that converts the sensor output signal of the first tilt sensor 71 into digital data, a second ADC (second A/D converter) 82 that converts the sensor output signal of the second tilt sensor 72 into digital data, a first offset correction circuit 83 that performs offset adjustment of the first tilt sensor 71, a second offset correction circuit 84 that performs offset adjustment of the second tilt sensor 72, a return beam sensor (return beam detector) 85 that detects the tilt detecting return beam level signal, which is the sum data of the two offset-adjusted sensor output data, a difference data generator (tilt error signal generator) 86 that generates the difference data between the two offset-adjusted sensor output data, a first coefficient multiplier 87 that performs amplitude adjustment of the sum data, a second coefficient multiplier (tilt error signal gain setting part) 88 that performs amplitude adjustment of the difference data, a reference difference generator 89 that generates difference data between the sum data amplitude-adjusted by the first coefficient multiplier 87 and the reference level, a first low pass filter 90 that removes high-frequency noise included in the difference data generated by the reference difference generator 89, a second low pass filter 91 that removes high-frequency noise included in the difference data amplitude-adjusted by the second coefficient multiplier 88, a decoder 92 that controls the amplitude of the data that passes through the first low pass filter 90 not to change drastically, a coefficient adjuster 93 that adjusts the coefficients for the first and second coefficient multipliers 87, 88 based on the output data of the decoder 92, and a DAC (D/A converter) 94 that converts the data that passes through the second low pass filter 91 into analog signals, based on which the tilt motor 75 is driven.

The first coefficient multiplier 87, reference difference generator 89, first low pass filter 90, decoder 92, and coefficient adjuster 93 correspond to a return beam gain setting part.

The tilt correction circuit 70 in FIG. 11 controls the tilt actuator 75 so that the difference data (tilt error signal) between the first and second tilt sensors 71, 72 is zero. Examples of cases where variation in the tilt detecting return beam intensity is present will now be described using FIG. 12.

Figure 12A:
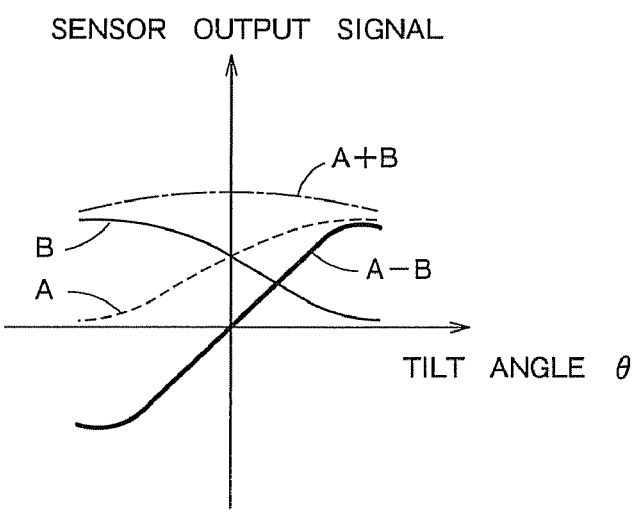
FIGS. 12A to 12C are waveform diagrams showing examples of sensor output data of a first and second tilt sensors 71, 72.
Figure 12B:
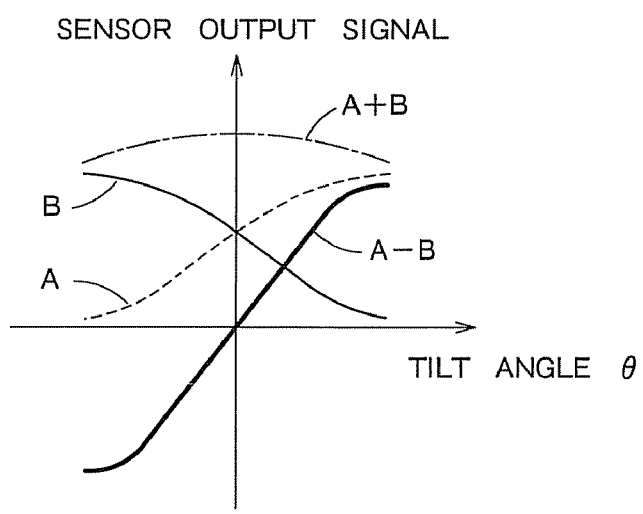
Figure 12C:
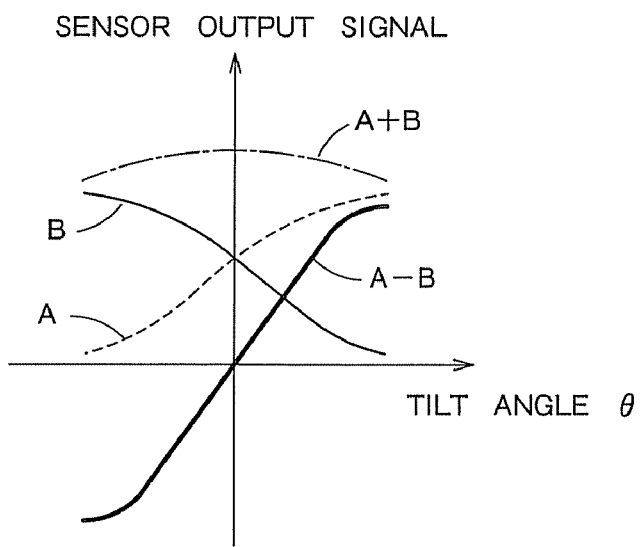

FIGS. 12A to 12C are waveform diagrams showing examples of the sensor output data A, B of the first and second tilt sensors 71, 72. The tilt angle on the disc surface is proportional to the difference data (A−B) between the two sensor output data A and B. As shown in FIGS. 12A to 12C, in cases where variation in the tilt detecting return beam intensity is present, the amplitude of the sensor output data A and B will not always be the same, even with the same disc surface tilt angle. When the amplitude of the sensor output data A and B changes, the difference data (A−B) therebetween also changes, and variation arises in the detection sensitivity of the tilt error signal.

Accordingly, in this embodiment, first of all, the return beam sensor 85 detects the overall light intensity and generates a tilt detecting return beam level signal. Then amplitude correction of the tilt error signal is performed based on the difference data between the tilt detecting return beam level signal and the reference level, so that the detection sensitivity for the tilt error signal does not vary with the reflected light intensity. More precisely, an amplitude adjustment amount for the tilt error signal is set according to the tilt detecting return beam level signal level so that the tilt in the vicinity of an origin point of the tilt error signal (zone where the tilt error signal level is zero) is roughly constant.

In FIG. 11, When it is assumed that the offset-adjusted sensor output data is denoted as $A_0$ and $B_0$, the amplitude adjustment coefficient for the first and second coefficient multipliers 87 and 88 is denoted as G, and the reference level is denoted as LVLREF, G is controlled automatically so that equation (26) below is established.

$$(A_0+B_0) \times G = LVLREF \quad (26)$$

where G is given by equation (27) below.

$$G = \frac{LVLREF}{(A_0 + B_0)} \quad (27)$$

Since the amplitude of the data $(A_0-B_0)$, representing the tilt angle of the disc surface is adjusted by the second coefficient multiplier 88, the relation in equation (28) below is established.

$$(A_0 - B_0) \times G = \frac{(A_0 - B_0)}{(A_0 + B_0)} \times LVLREF \quad (28)$$

As is clear from the right side of equation (28), the data expressing the tilt angle is normalized using the tilt detecting return beam level signal, and the tilt error signal detection sensitivity is constant at all times, regardless of the reflected light intensity.

FIG. 13 is a waveform diagram showing an example of the output signal of the second coefficient multiplier 88 in FIG.

11. As can be seen from FIG. 13, when the tilt angle is the same, the amplitude of the output signal of the second coefficient multiplier 88 becomes constant at all times, even if the amplitudes of the sensor output data A, B change. Hence, it is possible to reduce variation in the detection sensitivity of the tilt error signal.

FIG. 14 is a signal waveform diagram showing the first and second tilt sensor output data 81, 82, and the output signal of the second coefficient multiplier 88. As can be seen from FIG. 14, the amplitude of the output signal from the second coefficient multiplier 88 is constant at all times.

As described above, according to the Second Embodiment, the detection sensitivity of the tilt error can be maintained constant, because the amplitude of the difference data between the output data of the two sensors is adjusted using the amplitude adjustment coefficient determined so that the sum data of the output data of the two sensors coincides with the reference level.

Also, the scale of the hardware can be reduced, because the division process is unnecessary for adjustment of the difference data amplitude using the amplitude adjustment coefficient.

Although based on above description, those skilled in the art can figure out additional effects and variations of the present invention, the aspect of the present invention is not limited to the stated each embodiments. Various additions, alterations and partial deletions can be done to the present invention within the conceptualistic thought and purpose of the present invention drawn on the claims and the equivalents.

What is claimed is:

1. An optical disc drive device comprising:
    an FE signal generator which generates a focus error signal;
    a TE signal generator which generates a tracking error signal;
    a return beam detector which detects a return beam reflected by an optical disc after irradiated by an optical pickup to generate a return beam level signal;
    a return beam gain setting part which sets amplitude adjustment amount of the return beam level signal so that a signal level of the return beam level signal generated by the return beam detector coincides with a predetermined reference level;
    an FE gain setting part which sets amplitude adjustment amount of the focus error signal in accordance with the signal level of the return beam level signal adjusted by the return beam gain setting part so that a signal amplitude of the focus error signal is constant; and
    a TE gain setting part which sets amplitude adjustment amount of the tracking error signal in accordance with the signal level of the return beam level signal adjusted by the return beam gain setting part so that a signal amplitude of the tracking error signal is constant;
    wherein the return beam gain setting part includes:
    a first amplitude adjustment part which adjusts an amplitude of a difference between the signal level of the return beam level signal and the reference level by a first amplitude adjustment coefficient corresponding to the return beam level signal; and
    a first cumulative adder which calculates a cumulative adding value of the difference adjusted by the first amplitude adjustment coefficient,
    the FE gain setting part includes:
    a second amplitude adjustment part which adjusts the amplitude of the difference by a second amplitude adjustment coefficient corresponding to the focus error signal; and
    a second cumulative adder which calculates a cumulative adding value of the difference adjusted by the second amplitude adjustment coefficient,
    the TE gain setting part includes:
    a third amplitude adjustment part which adjusts the amplitude of the difference by a third amplitude adjustment coefficient corresponding to the tracking error signal; and
    a third cumulative adder which calculates a cumulative adding value of the difference adjusted by the third amplitude adjustment coefficient.

2. The drive device according to claim 1, further comprising:
    a first offset correction part which performs offset adjustment of the return beam level signal detected by the return beam detector;
    a second offset correction part which performs offset adjustment of the focus error signal generated by the FE signal generator; and
    a third offset correction part which performs offset adjustment of the tracking error signal generated by the TE signal generator,
    wherein the return beam gain setting part sets the amplitude adjustment amount of the return beam level signal after performing the offset adjustment by the first offset correction part;
    the FE gain setting part sets the amplitude adjustment amount of the focus error signal after performing the offset adjustment by the second offset correction part; and
    the TE gain setting part sets the amplitude adjustment amount of the tracking error signal after performing the offset adjustment by the third offset correction part.

3. The drive device according to claim 2, wherein each of the first to third offset correction parts is separately provided corresponding to playback and record operations of the optical disc.

4. The drive device according to claim 1, further comprising:
    a first gain correction part which performs gain adjustment of the return beam level signal detected by the return beam detector;
    a second gain correction part which performs gain adjustment of the focus error signal generated by the FE signal generator;
    a third gain correction part which performs gain adjustment of the tracking error signal generated by the TE signal generator; and
    a gain amount setting part which sets gain amount of the first to third gain correction parts based on the cumulative adding values of the first to third cumulative adders.

5. The drive device according to claim 4, wherein the gain amount setting part sets the gain amounts of the first to third gain correction parts based on the return beam level signal adjusted by the return beam gain setting part and a reference signal of the return beam level signal.

6. The drive device according to claim 4, wherein each of the first to third gain correction parts, the gain amount setting part and the first to third cumulative adders is separately provided corresponding to playback and record operations of the optical disc.

7. The drive device according to claim 4, wherein when the amplitude of the focus error signal and the amplitude of the tracking error signal increase in proportion to the amplitude of the return beam level signal, and a gradient of the focus error signal against the amplitude of the return beam level signal is equal to a gradient of the tracking error signal against the amplitude of the return beam level signal, the gain amount setting part sets the gain amounts of the first to third gain correction parts so that the amplitude of the focus error signal becomes equal to the amplitude of the tracking error signal, regardless of the amplitude of the return beam level signal.

8. The drive device according to claim 4, wherein when the amplitude of the focus error signal and the amplitude of the tracking error signal increase in proportion to the amplitude of the return beam level signal, and a gradient of the focus error signal against the amplitude of the return beam level signal is different from a gradient of the tracking error signal against the amplitude of the return beam level signal, the gain amount setting part sets the gain amounts of the first to third gain correction parts so that the amplitude of the focus error signal is constant, the amplitude of the tracking error signal is constant, and the amplitude of the focus error signal is different from the amplitude of the tracking error signal, regardless of the amplitude of the return beam level signal.

9. The drive device according to claim 4, wherein when the amplitude of the focus error signal and the amplitude of the tracking error signal increase in proportion to the amplitude of the return beam level signal, and a gradient of the focus error signal against the amplitude of the return beam level signal is different from a gradient of the tracking error signal against the amplitude of the return beam level signal, the gain amount setting part sets the gain amounts of the first to third gain correction parts so that the amplitude of the focus error signal is equal to the amplitude of the tracking error signal.

10. The drive device according to claim 4, wherein when the amplitude of the focus error signal increases in proportion to the amplitude of the return beam level signal, and the amplitude of the tracking error signal is constant, the gain amount setting part sets the gain amounts of the first to third gain correction parts so that the amplitude of the focus error signal is constant, the amplitude of the tracking error signal is constant, and the amplitude of the focus error signal is different from the amplitude of the tracking error signal, regardless of the amplitude of the return beam level signal.

11. The drive device according to claim 1, further comprising:
a layer jump control data generator which generates layer jump control data for moving a beam spot of a read-out beam between different layers of the optical disc;
a track search control data generator which generates track search control data for moving the beam spot in radial direction;
an FE servo part which generates a focus servo signal based on the layer jump control data and the focus error signal, the amplitude of the focus error signal being adjusted by the amplitude adjustment amount set by the FE gain setting part;
a TE servo part which generates a tracking servo signal based on the track search control data and the tracking error signal, the amplitude of the tracking error signal being adjusted by the amplitude adjustment amount set by the TE gain setting part;
a focus servo amplitude adjustment part which adjusts the amplitude of the focus servo signal to drive a focus actuator; and
a tracking servo amplitude adjustment part which adjusts the amplitude of the tracking servo signal to drive a tracking actuator.

12. The drive device according to claim 11, further comprising:
a first A/D converter which converts the focus error signal generated by the FE signal generator into a digital signal;
a second A/D converter which converts the tracking error signal generated by the TE signal generator into a digital signal;
a first D/A converter which converts the focus servo signal generated by the FE servo part into an analog signal; and
a second D/A converter which converts the tracking error signal generated by the TE servo part into an analog signal,
wherein the return beam gain setting part, the FE gain setting part, the TE gain setting part, the FE servo part and the TE servo part perform digital signal processes.

13. A tilt correction device comprising:
a first tilt sensor which irradiates an optical disc with a tilt detecting beam and detects a first reflected beam from the optical disc;
a second tilt sensor which irradiates the optical disc with a tilt detecting beam and detects a second reflected beam from the optical disc;
a return beam detector which detects a return beam level signal indicative of an adding signal of the first and second reflected beam signals;
a return beam gain setting part which sets amplitude adjustment amount of the return beam level signal so that a signal level of the return beam level signal coincides with a reference level;
a tilt error signal generator which detects a tilt error signal indicative of a difference signal between the first and second reflected signals; and
a tilt error signal gain setting part which sets amplitude adjustment amount of the tilt error signal in accordance with the signal level of the return beam level signal so that detection sensitivity of the tilt error signal is constant.

14. The tilt correction device according to claim 13, wherein the tilt error signal gain setting part sets the amplitude adjustment amount of the tilt error signal based on the amplitude adjustment amount of the return beam level signal set by the return beam gain setting part.

15. The tilt correction device according to claim 13, further comprising a low pass filter which removes high frequency noise included in the tilt error signal, a gain of the tilt error signal being adjusted by the amplitude adjustment amount set by the tilt error signal gain setting part.

16. The tilt correction device according to claim 13, further comprising:
a first A/D converter which converts the first reflected signal detected by the first tilt sensor into a digital signal;
a second A/D converter which converts the second reflected signal detected by the second tilt sensor into a digital signal; and
a D/A converter which converts the tilt error signal passing through the low pass filter into the analog signal,
wherein the return beam detector, the return beam gain setting part, the tilt error signal generator and the tilt error signal gain setting unit perform digital signal processes.

17. An optical disc drive device comprising:
an FE signal generator which generates a focus error signal;
a TE signal generator which generates a tracking error signal;
a return beam detector which detects a return beam reflected by an optical disc after irradiated by an optical pickup to generate a return beam level signal;
a return beam gain setting part which sets amplitude adjustment amount of the return beam level signal so that a signal level of the return beam level signal generated by the return beam detector coincides with a predetermined reference level;

an FE gain setting part which sets amplitude adjustment amount of the focus error signal in accordance with the signal level of the return beam level signal adjusted by the return beam gain setting part so that a signal amplitude of the focus error signal is constant;

a TE gain setting part which sets amplitude adjustment amount of the tracking error signal in accordance with the signal level of the return beam level signal adjusted by the return beam gain setting part so that a signal amplitude of the tracking error signal is constant; and a tilt correction part which detects a tilt of the optical disc, the tilt correction part includes:

a first tilt sensor which irradiates the optical disc with a tilt detecting beam and detects a first reflected beam from the optical disc;

a second tilt sensor which irradiates the optical disc with a tilt detecting beam and detects a second reflected beam from the optical disc;

a return beam detector which detects a return beam level signal indicative of an adding signal of the first and second reflected beam signals;

a return beam gain setting part which sets amplitude adjustment amount of the return beam level signal so that a signal level of the return beam level signal coincides with a reference level;

a tilt error signal generator which detects a tilt error signal indicative of a difference signal between the first and second reflected signals; and a tilt error signal gain setting part which sets amplitude adjustment amount of the tilt error signal in accordance with the signal level of the return beam level signal so that detection sensitivity of the tilt error signal is constant.

18. The drive device according to claim 17, further comprising:

a first offset correction part which performs offset adjustment of the return beam level signal detected by the return beam detector;

a second offset correction part which performs offset adjustment of the focus error signal generated by the FE signal generator; and a third offset correction part which performs offset adjustment of the tracking error signal generated by the TE signal generator, wherein the return beam gain setting part sets the amplitude adjustment amount of the return beam level signal after performing the offset adjustment by the first offset correction part;

the FE gain setting part sets the amplitude adjustment amount of the focus error signal after performing the offset adjustment by the second offset correction part; and the TE gain setting part sets the amplitude adjustment amount of the tracking error signal after performing the offset adjustment by the third offset correction part.

19. The drive device according to claim 17, further comprising:

a layer jump control data generator which generates layer jump control data for moving a beam spot of a read-out beam between different layers of the optical disc;

a track search control data generator which generates track search control data for moving the beam spot in radial direction;

an FE servo part which generates a focus servo signal based on the layer jump control data and the focus error signal, the amplitude of the focus error signal being adjusted by the amplitude adjustment amount set by the FE gain setting part;

a TE servo part which generates a tracking servo signal based on the tracking error signal, the amplitude of the tracking error signal being adjusted by the amplitude adjustment amount set by the TE gain setting part;

a focus servo amplitude adjustment part which adjusts the amplitude of the focus servo signal to drive a focus actuator; and a tracking servo amplitude adjustment part which adjusts the amplitude of the tracking servo signal to drive a tracking actuator.

* * * * *